United States Patent [19]

Poisel et al.

[11] Patent Number: 5,017,006
[45] Date of Patent: May 21, 1991

[54] LASER WARNING SENSOR

[75] Inventors: Hans Poisel, Dachau; Gert Trommer, Munich, both of Fed. Rep. of Germany

[73] Assignee: Messerschmitt-Boelkow-Blohm GmbH, Munich, Fed. Rep. of Germany

[21] Appl. No.: 416,912

[22] Filed: Oct. 4, 1989

[30] Foreign Application Priority Data

Oct. 4, 1988 [DE] Fed. Rep. of Germany ....... 3833635

[51] Int. Cl.$^5$ ............................ G01J 1/42; G01B 9/02
[52] U.S. Cl. ...................................... 356/218; 356/345
[58] Field of Search ...................... 356/345, 73.1, 346, 356/3, 4.5, 5, 27, 28, 28.5

[56] References Cited

U.S. PATENT DOCUMENTS 4,603,296 7/1986 Koo et al. ............................ 356/345
4,674,872 7/1987 Wright .

Primary Examiner—Vincent P. McGraw
Assistant Examiner—La Charles P. Keesee
Attorney, Agent, or Firm—W. G. Fasse; D. H. Kane, Jr.

[57] ABSTRACT

A laser warning receiver or detector for the detection of extraneous light not emanating from the laser to be detected. Thus, extraneous light is differentiated from incoming laser light. The laser radiation coming from a laser to be detected is detected on the basis of its time coherent radiation. Simultaneously, the wave length as well as the pulse form or shape are analyzed in spite of any presence of incoherent radiation components.

9 Claims, 1 Drawing Sheet

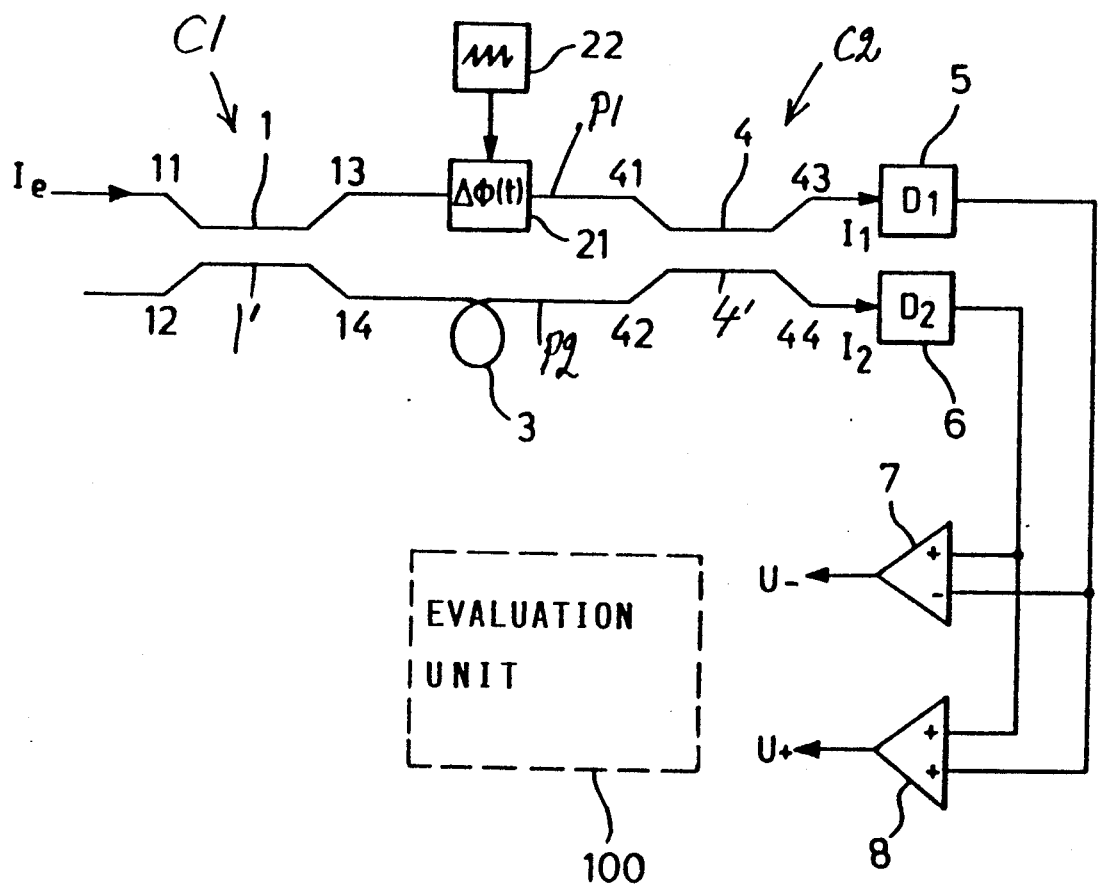

LASER WARNING SENSOR

FIELD OF THE INVENTION

The invention relates to a laser warning sensor or receiver for detecting and discriminating between incoming laser radiation and extraneous light.

BACKGROUND INFORMATION

Heretofore, laser light has been distinguished from light coming from other sources such as sun beams, lightnings, detonation light phenomena and so forth, in that the pulse rise time has been electronically measured. It is known that light pulses in a pulse sequence or pulse train come from a laser light source if the individual pulses have a very short rise time. Thus, only that radiation is interpreted as coming from a laser source which has shorter pulse rise times than a given threshold rise time value. This approach, however, is applicable only to pulse type laser sources. The approach is not applicable to lasers radiating on a continuous wave basis.

OBJECTS OF THE INVENTION

In view of the foregoing it is the aim of the invention to achieve the following objects singly or in combination:

to construct a laser warning sensor or receiver which is capable of receiving pulsed laser radiation as well as continuous wave laser radiation for providing a warning information; and to construct such a receiver to be capable of distinguishing between extraneous light not emanating from a laser source and light from any laser source to be detected.

SUMMARY OF THE INVENTION

The radar warning detector according to the invention is characterized by two 3-dB coupling devices interconnected by two optical paths. One optical path comprises an optical delay line while the other optical path comprises a phase shifter controlled by a signal generator. The output of the second coupling device operating as a phase/amplitude transformer, is connected to photo-detectors, such as photo-diodes, for converting the light signals into electrical signals which are supplied through amplifiers to a signal evaluating unit.

The just enumerated features of the invention achieve the objectives listed above. Additionally, the present detector is capable of ascertaining the wave length of a laser emitting a continuous wave and to also ascertain the pulse form of a pulsed laser. Thus, the present detector is capable of distinguishing between the coherent portions and the non-coherent portions of the radiation to be detected. Thus, the invention takes advantage of the fact that only a coherent radiation can emanate from a laser.

BRIEF DESCRIPTION OF THE DRAWING

In order that the invention may be clearly understood, it will now be described, by way of example, with reference to the single FIGURE of the accompanying drawing, showing a block diagram of the present detector.

DETAILED DESCRIPTION OF A PREFERRED EXAMPLE EMBODIMENT AND OF THE BEST MODE OF THE INVENTION

The single FIGURE of the present laser detector shows two 3-dB couplers C1 and C2 interconnected by light conductor paths P1 and P2. The first 3-dB coupler C1 has an input terminal 11 in the form of an optical element capable of receiving light and an output terminal 13 connected to the input terminal by a coupling element 1. The first coupler C1 also includes a second coupling element 1' between an arm 12 and an output arm 14. The second coupling device C2 comprises an input terminal 41 and an output terminal 43 interconnected by a coupling element 4. The second coupler C2 further includes an input terminal 42 and an output terminal 44 interconnected by a coupling element 4'. The first light conductor path P1 comprises a phase shifter 21 interconnecting the terminals 13 and 41. The second light conducting path P2 connects the terminals 14 and 42 with each other and includes a signal delay loop 3. The output terminals 43 and 44 of the second 3-dB coupler C2 are connected to inputs of respective photo-detectors 5 and 6, such as photo-diodes D1, D2, the outputs of which supply the produced electrical signals to respective amplifiers 7 and 8 to produce output signals $U_-$ and $U_+$. The outputs of the amplifiers 7, 8 are connected to a signal evaluation unit 100 of conventional construction.

Incoming light having an intensity $I_e$ is received at the input 11. The first coupling device C1 distributes the received light evenly or uniformly to both outputs 13 and 14. The light conductor P2 may, for example, be a dielectric wave guide which transmits the light from the output 14 to the input 42 of the second coupler C2. The delay by the delay loop 3 is so selected that the path P2 is either longer or shorter, for example, by 5 mm, than the optical path P1 between the output 13 and the input 41. Thus the length of the delay loop 3 is so selected that the path difference between the two paths P1 and P2 corresponds to the minimal coherence length of the relevant laser types, the light of which is to be detected.

The light output proportion at the output 13 of the coupler C1 passes the phase shifter 21 which is electrically controlled by a signal generator 22, for example, a saw-tooth signal generator. As a result, the light appearing at the input 41 of the second coupling device C2 has a time dependent phase shift $\Delta\Phi(t)$. Due to the phase shift and the delay, the two light proportions in the coupler C2 interfere with each other. The coupler C2 functioning as a phase/amplitude transformer, delivers at its two outputs 43 and 44 phase dependent signals $I_1$ and $I_2$ which are transformed into respective electrical signals by the photo-diodes D1, D2. The signals $I_1$ and $I_2$ are expressed as follows:

$$I_1 = \tfrac{1}{2}I_k(1-\cos\Phi(t))+\tfrac{1}{2}I_i$$

$$I_2 = \tfrac{1}{2}I_k(1+\cos\Phi(t))=\tfrac{1}{2}I_i$$

where $I_i$ is the incoherent signal proportion, and wherein $I_k$ is the coherent proportion of the incoming radiation. Further, $I_e = I_i + I_k$. Only the coherent signal proportions in each signal $I_1$ and $I_2$ can interfere with each other, due to the optical path length difference. The incoherent proportion merely adds to the intensity of the light signals. The value $\Phi(t)$ represents the time dependent phase difference between the two light paths P1 and P2.

The signals at the outputs of the amplifiers 7 and 8, namely $U_-$ and $U_+$ are defined as follows:

$$U_- = v \cdot I_k \cos(\Phi(t))$$

$$U_+ = v \cdot (I_i + I_k)$$

wherein v is the amplification factor of the amplifiers 7 and 8.

The phase shift $\Phi(t)$ comprises two components. One component is based on the optical path difference of the two light paths P1 and P2, namely:

$$\Delta\Phi_1 = n\Delta L \, 2\pi/\lambda$$

and the phase difference $$\Delta\Phi(t) = \Delta n(t) 2\pi/\lambda$$

caused by the phase shifter 21. Thus, $\Phi(t)$ is obtained from the following equation:

$$\Phi(t) = (n\Delta L + \Delta n(t)l) \, 2\pi/\lambda$$

wherein
 $\Delta L$ = difference in light path lengths of P1 and P2;
 l = length of phase shifter 21;
 $\Delta n(t)$ = refractory index of phase shifter 21 as varied in time by signal generator 22;
 n = refractory index of light path difference;
 $\lambda$ = is the wave length of the received light.

A circuit for realizing the signal generator 22 may, for example, be an integrated optical circuit on a lithium niobate (LiNbO$_3$). Another phase shifter control circuit could be realized by a piezo crystal to which a glass fiber conductor is attached in a stretched manner, whereby the refractory index may be changed by a mechanical tension applied by means of the piezo-electric crystal, and whereby the length may be changed by applying stretching tensile stress by means of the piezoelectric crystal.

If $\Phi(t)$ is varied, for example, by generating a saw-tooth function in the signal generator 22, we obtain:

$$(\Delta n(t) = \Delta n_{max} \cdot s \cdot t)$$

wherein $$t < T_{max}$$

As a result $U_-$ during the steadily rising branching of saw-tooth can be expressed as follows:

$$U_- = v I_k \cos(2\pi/\lambda \, n\Delta L + 2\pi/\lambda \, l\Delta n_{max} s \cdot t)$$

thus, $U_-$ is a time periodic oscillation having the frequency $\Omega$ expressed as follows:

$$\Omega = 2\pi l \Delta n_{max} s/\lambda$$

By making sure that the saw-tooth function or rather the saw-tooth pulses have a sufficiently steep rise, it is possible to pass through several periods of the cosine function. Thus, it is possible to calculate $U_-$ as well as $\Omega$ and thus also the wave length of the laser radiation being received. Similarly, the coherent component $I_k$ can thus be determined.

From the foregoing and from $U_+$ it is possible to calculate the ratio of the coherent component to the incoherent component of the received radiation. In case the laser emits a pulsed radiation or a radiation that varies in time, it is possible to analyze the wave or pulse form with the aid of the information available for $U_+$. Further, by using the information available for $U_-$ one can ascertain that the received pulse is indeed the emanating from a laser. However, the condition for this possibility is the fact that the pulse duration is larger than $1/\Omega$.

Although the invention has been described with reference to specific example embodiments, it will be appreciated, that it is intended to cover all modifications and equivalents within the scope of the appended claims.

What we claim is:

1. A laser warning detector comprising means for differentiating between laser radiation to be detected and extraneous light radiation, said differentiating means comprising optical input means for receiving laser and light radiation, two light conductor paths, a first coupling means (C1) connected to said optical input means and to said two light conductor paths for distributing received radiation into said two light conductor paths, a second coupling means (C2) connected to said two light conductor paths, photo-detector means connected to said second coupling means for converting received light signals into respective electrical signals, amplifier means connected to said photo-detector means, and signal evaluating circuit means connected to said amplifier means for providing a respective warning information, one of said light conductor paths between said first and second coupling means (C1, C2) comprising a signal delay means (3) for determining the optical length of said one light conductor path, the other light conductor path comprising phase shifter means (21) and control signal generator means (22) connected to said phase shifter means (21) for varying a phase shift as a function of time, whereby said second coupling means (C2) functioning as a phase/amplitude transformer, receives phase dependent signals that are supplied to said photo-detector means, and wherein said signal delay means (3) in said one light conductor path are so selected that an optical path length difference between said two light conductor paths corresponds to a coherence length of a respective laser light to be detected.

2. The laser warning detector of claim 1, wherein said signal delay means in said one light conductor path comprise a glass fiber light conductor formed into a loop (3).

3. The laser warning detector of claim 1, wherein said first and second coupling means are 3-dB couplers.

4. The laser warning detector of claim 1, wherein an optical path length of said one light conductor path is longer than an optical path length of said other light conductor path due to said signal delay means in said one light conductor path.

5. The laser warning detector of claim 1, wherein an optical path length of said one light conductor path is shorter than an optical path length of said other light conductor path due to said signal delay means in said one light conductor path.

6. The laser warning detector of claim 1, wherein said control signal generator means (22), which controls the phase shifting function of said phase shifter (21), comprises an integrated optical circuit on LiNbO$_3$.

7. The laser warning detector of claim 6, wherein said control signal generator means is a saw-tooth generator for controlling said phase shifting function.

8. The laser warning detector of claim 1, wherein said control signal generator means comprises a piezo-electric crystal, a light conductor fiber secured to said piezo electric crystal in a stretched manner, and means for influencing said piezo-electric crystal for changing the function of said control signal generator means to thereby vary the optical length (l) of said phase shifter (21).

9. The laser warning detector of claim 8, wherein said control signal generator means produces a saw-tooth function that is variable influencing said piezo-electric crystal.

* * * * *

UNITED STATES PATENT AND TRADEMARK OFFICE
CERTIFICATE OF CORRECTION

PATENT NO. : 5,017,006
DATED : May 21, 1991
INVENTOR(S) : Hans Poisel et al.

It is certified that error appears in the above-identified patent and that said Letters Patent is hereby corrected as shown below:

Column 2, line 60, replace the line to read:
$$--I_2 = \tfrac{1}{2} I_k (1+\cos\Phi(t)) + \tfrac{1}{2} I_i;--;$$

Column 3, line 20, replace the line to read:
$$--\Delta\Phi(t) = \Delta n(t) l\, 2\pi/\lambda\ --\ ;$$

Column 6, line 6, after "variable" insert --by--.

Signed and Sealed this

Fifteenth Day of September, 1992

*Attest:*

DOUGLAS B. COMER

*Attesting Officer*     *Acting Commissioner of Patents and Trademarks*